US010029697B1

(12) United States Patent
MacDonald et al.

(10) Patent No.: US 10,029,697 B1
(45) Date of Patent: Jul. 24, 2018

(54) SYSTEMS AND METHODS FOR CLASSIFYING DRIVER SKILL LEVEL

(71) Applicant: GM Global Technology Operations LLC, Detroit, MI (US)

(72) Inventors: Alexander J. MacDonald, West Bloomfield, MI (US); Christopher J. Barber, West Bloomfield, MI (US); Stephen A. Padilla, Milford, MI (US); Michael G. Petrucci, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/412,511

(22) Filed: Jan. 23, 2017

(51) Int. Cl.
*B60W 40/09* (2012.01)
*B60W 40/107* (2012.01)
*B60W 40/109* (2012.01)
*B60W 50/08* (2012.01)
*B60W 30/182* (2012.01)
*B60R 16/023* (2006.01)

(52) U.S. Cl.
CPC ......... *B60W 40/09* (2013.01); *B60R 16/0231* (2013.01); *B60W 30/182* (2013.01); *B60W 40/107* (2013.01); *B60W 40/109* (2013.01); *B60W 50/082* (2013.01)

(58) Field of Classification Search
CPC ............. B60W 40/09; B60W 16/0231; B60W 30/182; B60W 40/107; B60W 40/109; B60W 50/082; B60R 16/0231; A61B 5/18; G09B 19/16–19/167
See application file for complete search history.

(56) References Cited

U.S. PATENT DOCUMENTS

| 6,408,229 B1 | 6/2002 | Loudon et al. |
| 6,449,572 B1* | 9/2002 | Kurz .................. B60R 16/0231 702/92 |
| 6,873,911 B2* | 3/2005 | Nishira ..................... B60T 7/16 340/436 |
| 2002/0022915 A1 | 2/2002 | Chen et al. |
| 2002/0042671 A1 | 4/2002 | Chen et al. |
| 2004/0002795 A1* | 1/2004 | Tanimoto ............... B60T 8/172 701/1 |
| 2004/0011572 A1 | 1/2004 | Harty |
| 2004/0249533 A1 | 12/2004 | Wheals et al. |

(Continued)

FOREIGN PATENT DOCUMENTS

WO WO-2017/044757 A1 3/2017

OTHER PUBLICATIONS

U.S. Appl. No. 15/412,395, filed Jan. 23, 2017, Petrucci et al.
U.S. Appl. No. 15/412,661, filed Jan. 23, 2017, Petrucci et al.

*Primary Examiner* — Courtney D Heinle (57) ABSTRACT

A vehicle control system includes a function that relates (i) pairs of lateral and longitudinal acceleration values to (ii) skill values. A skill module: receives both (i) a lateral acceleration of the vehicle and (ii) a longitudinal acceleration of the vehicle; and, using the function, determines a skill value of a driver of the vehicle based on both (i) the lateral acceleration of the vehicle and (ii) the longitudinal acceleration of the vehicle. A skill level module determines a skill level of the driver of the vehicle based on the skill value. An actuator control module, based on the skill level of the driver, selectively actuates a dynamics actuator of the vehicle.

10 Claims, 7 Drawing Sheets

(56) References Cited

U.S. PATENT DOCUMENTS

| | | | |
|---|---|---|---|
| 2007/0001831 A1* | 1/2007 | Raz | B60R 16/0231 340/439 |
| 2007/0213886 A1* | 9/2007 | Zhang | B60W 40/09 701/1 |
| 2009/0312911 A1 | 12/2009 | Matthews | |
| 2010/0055649 A1* | 3/2010 | Takahashi | B60W 50/082 434/66 |
| 2010/0209886 A1* | 8/2010 | Lin | B60W 40/09 434/65 |
| 2010/0209888 A1* | 8/2010 | Huang | B60W 40/09 434/65 |
| 2010/0209889 A1* | 8/2010 | Huang | B60W 40/09 434/65 |
| 2010/0209891 A1* | 8/2010 | Lin | G09B 9/05 434/66 |
| 2010/0211270 A1* | 8/2010 | Chin | B60W 40/09 701/44 |
| 2014/0272810 A1* | 9/2014 | Fields | G09B 19/14 434/65 |
| 2014/0350789 A1 | 11/2014 | Anker et al. | |
| 2015/0235485 A1* | 8/2015 | Nemat-Nasser | G07C 5/08 701/1 |
| 2015/0336587 A1* | 11/2015 | Inoue | B60W 50/087 701/41 |
| 2017/0089274 A1 | 3/2017 | Kolhouse et al. | |
| 2017/0210388 A1* | 7/2017 | Wieskamp | B60W 40/09 |

* cited by examiner

SYSTEMS AND METHODS FOR CLASSIFYING DRIVER SKILL LEVEL

CROSS-REFERENCE TO RELATED APPLICATIONS

This application is related to U.S. patent application Ser. No. 15/412,395 filed on Jan. 23, 2017, and Ser. No. 15/412,661 filed on Jan. 23, 2017. The entire disclosures of the above applications are incorporated herein by reference.

FIELD

The present disclosure relates to systems and methods for controlling actuators of a vehicle that vary vehicle dynamics.

INTRODUCTION

The introduction provided here is for the purpose of generally presenting the context of the disclosure. Work of the presently named inventors, to the extent it is described in this introduction section as well as other aspects of the description are neither expressly nor impliedly admitted as prior art against the present disclosure.

Internal combustion engines combust an air and fuel mixture within cylinders to drive pistons, which produces torque. In some types of engines, air flow into the engine may be regulated via a throttle. The throttle may adjust throttle area, which increases or decreases air flow into the engine. As the throttle area increases, the air flow into the engine increases.

A fuel control system adjusts the rate that fuel is injected to provide a desired air/fuel mixture to the cylinders and/or to achieve a requested amount of torque. Increasing the amount of air and fuel provided to the cylinders generally increases the torque output of the engine. The engine may output torque to wheels via driveline components, such as a transmission, one or more differentials, and a plurality of shafts. Some vehicles, such as hybrid vehicles and electric vehicles, additionally or alternatively include one or more electric motors that output torque to wheels via driveline components.

SUMMARY

In a feature, a vehicle control system includes a function that relates (i) pairs of lateral and longitudinal acceleration values to (ii) skill values. A skill module: receives both (i) a lateral acceleration of the vehicle and (ii) a longitudinal acceleration of the vehicle; and, using the function, determines a skill value of a driver of the vehicle based on both (i) the lateral acceleration of the vehicle and (ii) the longitudinal acceleration of the vehicle. A skill level module determines a skill level of the driver of the vehicle based on the skill value. An actuator control module, based on the skill level of the driver, selectively actuates a dynamics actuator of the vehicle.

In further features, the skill level module selects the skill level of the driver from a group comprising a first skill level, a second skill level indicative of a greater level of skill than the first skill level, and a third skill level indicative of a greater level of skill than the second skill level.

In further features, the skill values of the function increase as at least one of: (i) a magnitude of lateral acceleration increases and (ii) a magnitude of longitudinal acceleration increases.

In further features: the skill values increase at a first rate as lateral acceleration becomes more positive given a constant longitudinal acceleration; the skill values increase at a second rate as lateral acceleration becomes more positive and longitudinal acceleration becomes one of (i) more positive and (ii) more negative; and the second rate is greater than the first rate.

In further features: the skill values increase at a first rate as lateral acceleration becomes more negative given a constant longitudinal acceleration; the skill values increase at a second rate as lateral acceleration becomes more negative and longitudinal acceleration becomes one of (i) more positive and (ii) more negative; and the second rate is greater than the first rate.

In further features: the skill values increase at a first rate as longitudinal acceleration becomes more positive given a constant lateral acceleration; the skill values increase at a second rate as longitudinal acceleration becomes more positive and lateral acceleration becomes one of (i) more positive and (ii) more negative; and the second rate is greater than the first rate.

In further features: the skill values increase at a first rate as longitudinal acceleration becomes more negative given a constant lateral acceleration; the skill values increase at a second rate as longitudinal acceleration becomes more negative and lateral acceleration becomes one of (i) more positive and (ii) more negative; and the second rate is greater than the first rate.

In further features, the lateral acceleration of the vehicle is measured using a lateral acceleration sensor.

In further features, the longitudinal acceleration of the vehicle is measured using a longitudinal acceleration sensor.

In further features, the dynamic actuator includes one of: an electronic limited slip differential; an electronic power steering motor; an automatic braking system (ABS) actuator; a ride control actuator; and an aerodynamic actuator.

In a feature, a vehicle control method includes: receiving both (i) a lateral acceleration of the vehicle and (ii) a longitudinal acceleration of the vehicle; using a function that relates (i) pairs of lateral and longitudinal acceleration values to (ii) skill values, determining a skill value of a driver of the vehicle based on both (i) the lateral acceleration of the vehicle and (ii) the longitudinal acceleration of the vehicle; determining a skill level of the driver of the vehicle based on the skill value; and, based on the skill level of the driver, selectively actuating a dynamics actuator of the vehicle.

In further features, determining the skill level includes selecting the skill level of the driver from a group comprising a first skill level, a second skill level indicative of a greater level of skill than the first skill level, and a third skill level indicative of a greater level of skill than the second skill level.

In further features, the skill values of the function increase as at least one of: (i) a magnitude of lateral acceleration increases and (ii) a magnitude of longitudinal acceleration increases.

In further features: the skill values increase at a first rate as lateral acceleration becomes more positive given a constant longitudinal acceleration; the skill values increase at a second rate as lateral acceleration becomes more positive and longitudinal acceleration becomes one of (i) more positive and (ii) more negative; and the second rate is greater than the first rate.

In further features: the skill values increase at a first rate as lateral acceleration becomes more negative given a constant longitudinal acceleration; the skill values increase at a second rate as lateral acceleration becomes more negative and longitudinal acceleration becomes one of (i) more positive and (ii) more negative; and the second rate is greater than the first rate.

In further features: the skill values increase at a first rate as longitudinal acceleration becomes more positive given a constant lateral acceleration; the skill values increase at a second rate as longitudinal acceleration becomes more positive and lateral acceleration becomes one of (i) more positive and (ii) more negative; and the second rate is greater than the first rate.

In further features: the skill values increase at a first rate as longitudinal acceleration becomes more negative given a constant lateral acceleration; the skill values increase at a second rate as longitudinal acceleration becomes more negative and lateral acceleration becomes one of (i) more positive and (ii) more negative; and the second rate is greater than the first rate.

In further features, the vehicle control method further includes measuring the lateral acceleration of the vehicle using a lateral acceleration sensor.

In further features, the vehicle control method further includes measuring the longitudinal acceleration of the vehicle using a longitudinal acceleration sensor.

In further features, the dynamic actuator includes one of: an electronic limited slip differential; an electronic power steering motor; an automatic braking system (ABS) actuator; a ride control actuator; and an aerodynamic actuator.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some vehicles include one or more actuators that can be adjusted to vary vehicle dynamics. Such actuators can be called dynamics actuators. Examples of dynamics actuators include, but are not limited to actuators of an electronic limited slip differential, an electronic power steering system, an automatic braking system, a ride control system, and an aerodynamic system. Control of dynamics actuators can be tuned for drivers of varying skill levels and handling types, such as oversteering, understeering, and neutral steering.

According to the present application, a dynamics control module determines a skill level of the driver, such as novice, skilled, or expert. The dynamics control module determines the skill level of the driver based on both lateral and longitudinal acceleration of the vehicle. For example, the dynamics control module may determine the skill level using a mapping of skill level values indexed by sets of lateral and longitudinal acceleration. Higher lateral or longitudinal acceleration, and more particularly higher lateral and longitudinal acceleration, may indicate a higher skill level of the driver, such as skilled or expert.

The dynamics control module also determines a handling type, such as oversteering, understeering, or neutral steering. The dynamics control module may determine the handling type, for example, based on a gradient of steering wheel angle. The vehicle may be controlled for understeer when lower steering wheel angle gradients are present than when the vehicle is controlled for neutral handling. The vehicle may be controlled for neutral handling when lower steering wheel angle gradient are present than when the vehicle is controlled for oversteering.

The dynamics control module determines when and how to control actuation of the dynamics actuators based on the skill level and the handling type. In this way, the dynamics control module tailors actuation of the dynamics actuators to the driver's skill level and the handling type. This allows drivers of different skill levels to experience similar or identical vehicle dynamics and also allows one driver to experience consistent vehicle dynamics across different road conditions, handling types, and different operating conditions.

Figure 1:
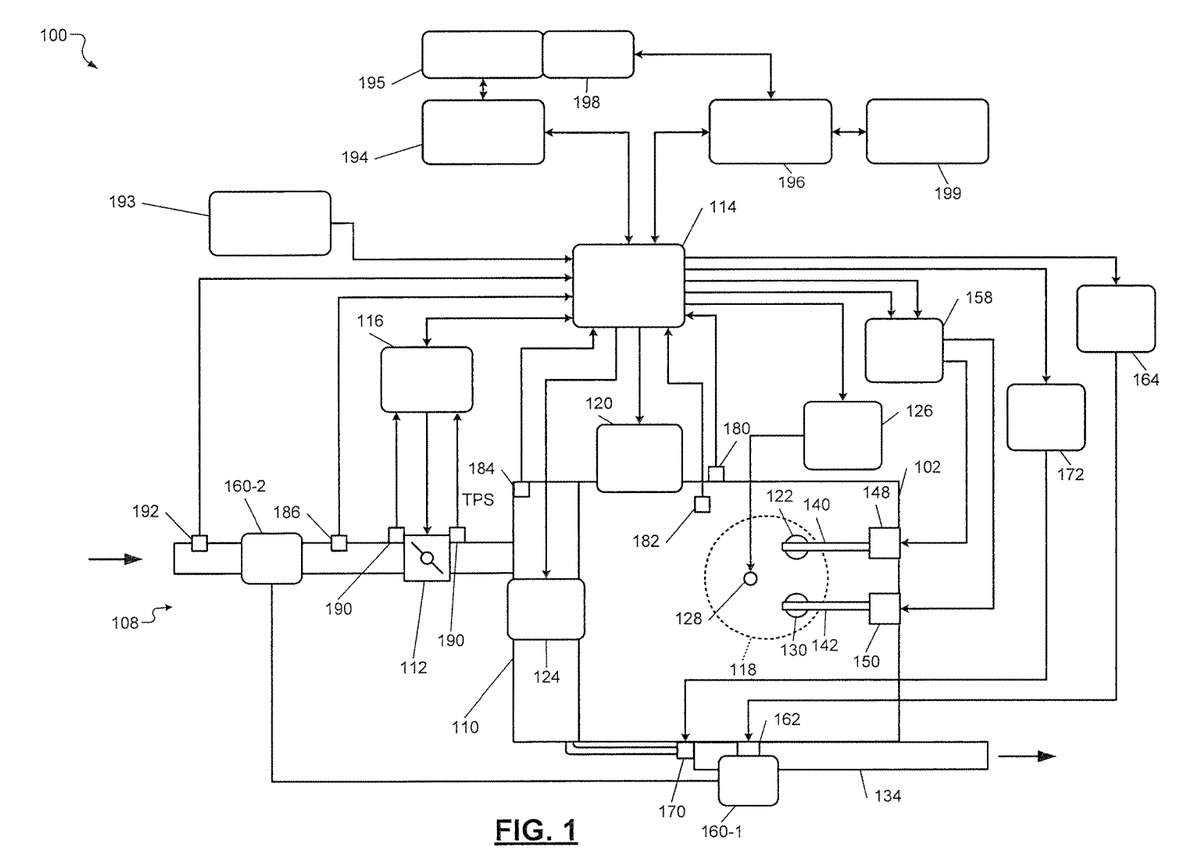
FIG. 1 is a functional block diagram of an example powertrain system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. Also while separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied by an intake cam phaser 148. The time when the exhaust valve 130 is opened may be varied by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), a steering wheel angle (SWA) sensor, and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and a motor generator unit (MGU) 198. While the example of one MGU is provided, multiple MGUs and/or electric motors may be implemented. Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, as a function of the driver input(s) using one or more equations and/or lookup tables that relate the driver input(s) to torque requests.

Under some circumstances, the hybrid control module 196 controls the MGU 198 to output torque, for example, to supplement engine torque output. The hybrid control module 196 applies electrical power from a battery 199 to the MGU 198 to cause the MGU 198 to output positive torque. While the example of the battery 199 is provided, more than one battery may be used to supply power to the MGU 198. The MGU 198 may output torque, for example, to the engine 102, to an input shaft of the transmission 195, to an output shaft of the transmission 195, or to another torque transfer device of the powertrain of the vehicle. The battery 199 may be dedicated for the MGU 198 and one or more other batteries may supply power for other vehicle functions.

Under other circumstances, the hybrid control module 196 may control the MGU 198 to convert mechanical energy of the vehicle into electrical energy. The hybrid control module 196 may control the MGU 198 to convert mechanical energy into electrical energy, for example, to recharge the battery 199. This may be referred to as regeneration. While the examine of an engine system including both the engine 102 and the MGU 198 is provided, the present application is also applicable to vehicles that include only an engine for vehicle propulsion and vehicles that include only one or more electric motors and/or MGUs for vehicle propulsion.

Figure 2:
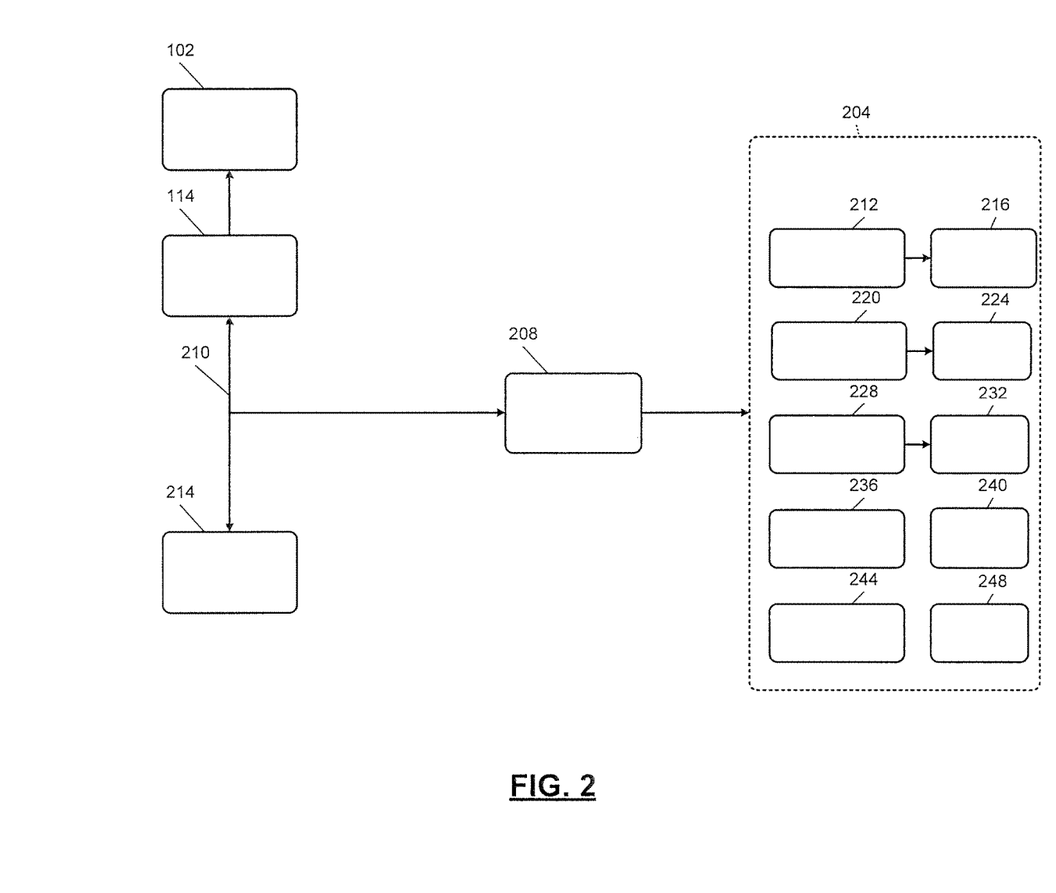
FIG. 2 is a functional block diagram of an example vehicle dynamics control system.

FIG. 2 is a functional block diagram of a vehicle dynamics control system including one or more dynamics actuators 204 of the vehicle, a dynamics control module 208, and a communication bus 210. The dynamics control module 208, the ECM 114, and one or more other vehicle control modules 214 communicate via the communication bus 210. For example only, the communication bus 210 may include a car area network (CAN) bus or another suitable type of communication bus. While the example of one communication bus is provided, two or more communication busses may be used. Examples of the other vehicle control modules 214 include the transmission control module 195, the hybrid control module 196, and other vehicle control modules. In various implementations, functionality of one or more control modules of the vehicle may be combined within a single module.

The dynamics actuators 204 vary vehicle dynamics. The dynamics control module 208 controls actuation of the dynamics actuators 204, as discussed further below. For example, an electronic limited slip differential (ELSD) actuator module 212 may control an ELSD 216 based on signals from the dynamics control module 208. The ELSD 216 regulates a rotational speed of one drive shaft relative to a rotational speed of another drive shaft of the vehicle. An electronic power steering (EPS) actuator module 220 controls an EPS motor 224 based on signals from the dynamics control module 208. The EPS motor 224 controls steering (turning) of wheels of the vehicle. The dynamics control module 208 may generate the signals for controlling the EPS motor 224, for example, based on a steering wheel angle (SWA) measured using one or more SWA sensors. The SWA sensors measure angular displacement of a steering wheel relative to a predetermined angle (e.g., where the vehicle should travel along its longitudinal axis) of the steering wheel. A user rotates the steering wheel to request turning of the vehicle.

An automatic braking system (ABS) actuator module 228 controls actuation of one or more ABS actuators 232 based on signals from the dynamics control module 208. The ABS actuator(s) 232 may control brake fluid flow to and from, and therefore brake fluid pressure applied to, brake calipers of the vehicle. A ride actuator module 236 controls ride control actuators 240, such as magnetic ride control actuators or another type of electronic ride control actuator, based on signals from the dynamics control module 208. One ride control actuator may be implemented at each wheel of the vehicle. The ride control actuators 240 may control, for example, ride height and damping. An aero actuator module 244 controls one or more aerodynamic actuators 248 based on signals from the dynamics control module 208. Examples of aerodynamic actuators include, for example, spoilers and splitters. The aerodynamic actuator(s) 248 are actuatable to vary aerodynamics, downforce, and lift. While examples of the dynamics actuators 204 are provided, the present application is also applicable to other dynamics actuators of vehicles.

Figure 3:
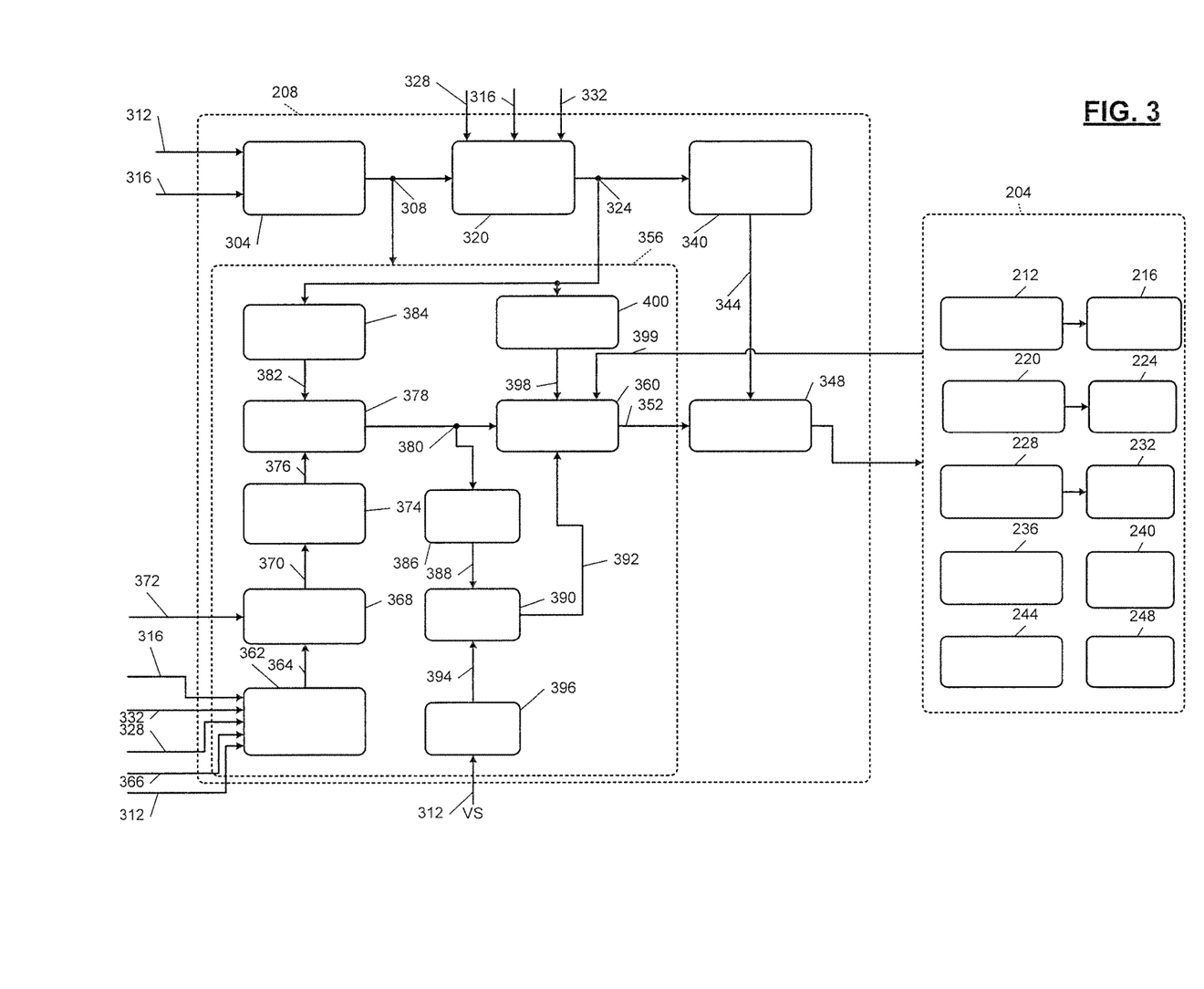
FIG. 3 is a functional block diagram of an example dynamics control module.

FIG. 3 is a functional block diagram of the dynamics control module 208. A track module 304 determines whether the driver of the vehicle is driving the vehicle in a track state or not. The track module 304 sets a track signal 308 to a first state when the driver is driving the vehicle in the track state and sets the track signal 308 to a second state when the driver is not driving the vehicle in the track state. As discussed further below, when in the track state, one or more of the dynamics actuators 204 may be controlled and/or adjusted based on vehicle yaw and classification of characteristics of the driver.

The track module 304 may determine whether the driver is driving the vehicle in the track state, for example, based on a vehicle speed (VS) 312 and a lateral acceleration 316 of the vehicle. For example, the track module 304 may increment a counter value when both the vehicle speed 312 is greater than a predetermined speed and the lateral acceleration 316 (e.g., a magnitude) is greater than a predetermined acceleration. The track module 304 may decrement the counter value when at least one of the vehicle speed 312 is less than the predetermined speed and the lateral acceleration 316 is less than the predetermined acceleration.

The track module 304 may set the track signal 308 to the first state when the counter value is greater than a predetermined value that is greater than zero. When the counter value is less than the predetermined value, the track module 304 may set the track signal 308 to the second state. The vehicle speed 312 may be determined, for example, based on an average of one or more wheel speeds of the vehicle. Wheel speeds may be measured using wheel speed sensors. The lateral acceleration 316 may be, for example, measured using a lateral acceleration sensor. Further information regarding determining whether the vehicle is being driven on a track (e.g., the first state) or not (e.g., the second state) may be found in commonly assigned U.S. Pat. No. 6,408, 229, which is incorporated herein in its entirety.

A classification module 320 generates a classification 324 for the driver of the vehicle. The classification 324 may include a skill level of the driver, such as novice, skilled, or expert, although the skill levels may be named differently and a greater or lesser number of skill levels may be used. For example, first, second, and third skill levels may be used where the second skill level indicates a higher skill level than the first skill level, and the third skill level indicates a higher skill level than the second skill level.

For some (e.g., only skilled and expert) or all skill levels, the classification 324 may also include a handling type, such as oversteer, neutral, or understeer. The handling type may indicate whether the vehicle is being controlled to account for oversteer, understeer, or neutrally.

When the track signal 308 is in the first state, the classification module 320 sets the classification based on the lateral acceleration 316, a steering wheel angle (SWA) 328, and a longitudinal acceleration 332 of the vehicle. The SWA 328 may be, for example, measured using one or more steering wheel angle sensors. The longitudinal acceleration 332 may be, for example, measured using one or more longitudinal acceleration sensors. When the track signal 308 is in the second state, the classification module 320 may set the classification 324 to indicate no classification (of skill level or handling type).

Figure 4:
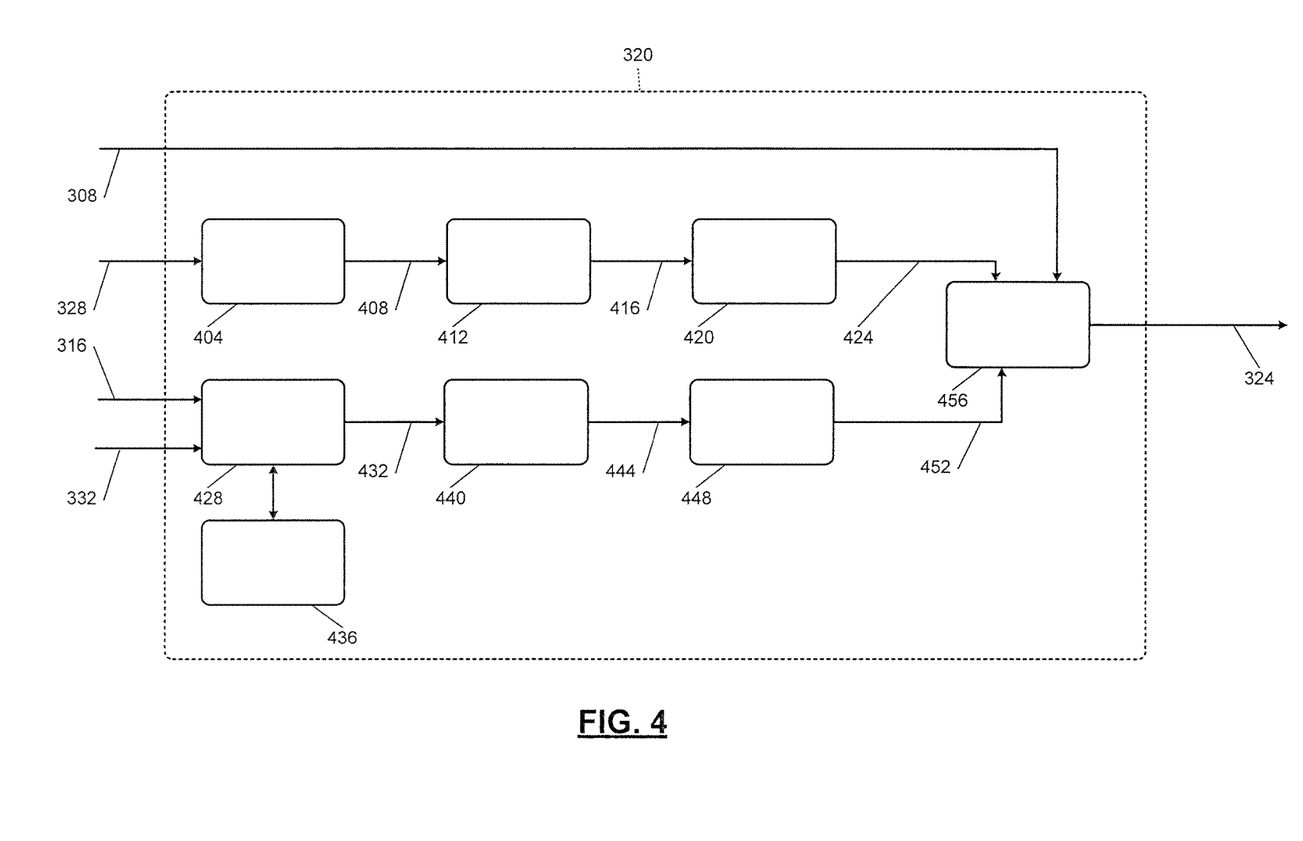
FIG. 4 is a functional block diagram of an example classification module.

FIG. 4 is a functional block diagram of an example implementation of the classification module 320. The SWA 328 may be sampled at a predetermined rate. A rate of change module 404 determines SWA rate of change (ROC) 408 based on a difference between samples of the SWA 328 (e.g., a present sample and a last sample) and the period between those samples. The period between consecutive samples corresponds to the predetermined rate.

A first average module 412 determines an average SWA ROC 416 based on an average of a plurality of the SWA ROCs 408. For example, the first average module 412 may set the average SWA ROC 416 based on or equal to an average of the most recent predetermined number of the SWA ROCs 408. The first average module 412 may, for example, sum the predetermined number of the most recent SWA ROCs 408 and divide the sum by the predetermined number.

A handling module 420 determines a handling type 424 of the driver based on the average SWA ROC 416. For example, the handling module 420 may set the handling type 424 to oversteer when the average SWA ROC 416 is greater than a first predetermined ROC, such as approximately 48 degrees per second or another suitable ROC. The handling module 420 may set the handling type 424 to understeer when the average SWA ROC 416 is less than a second predetermined ROC that is less than the first predetermined ROC, such as approximately 38 degrees per second or another suitable ROC. The handling module 420 may set the handling type 424 to neutral when the average SWA ROC 416 is between the first predetermined ROC and the second predetermined ROC.

In various implementations, the first and second predetermined ROCs may be set based on the skill level of the driver. For example, a first set of first and second predetermined ROCs may be used when the skill level is expert and a second set of first and second predetermined ROCs when the driver's skill level is skilled, etc. An example table of SWA ROCs observed for expert skill level drivers is provided below.

|  | Expert Oversteer | Expert Neutral | Expert Understeer |
| --- | --- | --- | --- |
| SWA ROC (Deg/Sec) | 50-55 | 40-45 | 30-35 |

A skill module 428 determines a skill value 432 based on the longitudinal acceleration 332 and the lateral acceleration 316. The lateral and longitudinal accelerations 316 and 332 may be sampled at a predetermined rate. Each skill value corresponds to a skill level of the driver for that lateral and longitudinal acceleration. The skill module 428 determines the skill value 432 for a given longitudinal and lateral acceleration using a skill value function 436. The skill value function 436 may be, for example, one or more equations that relate lateral and longitudinal acceleration values to skill values. As another equation, the skill value function 436 may be a three-dimensional mapping of skill values indexed by sets of lateral and longitudinal acceleration values. In various implementations, the skill value function 436 may further involve vehicle speed and the skill module 428 may determine the skill value 432 further based on the vehicle speed 312.

Figure 5:
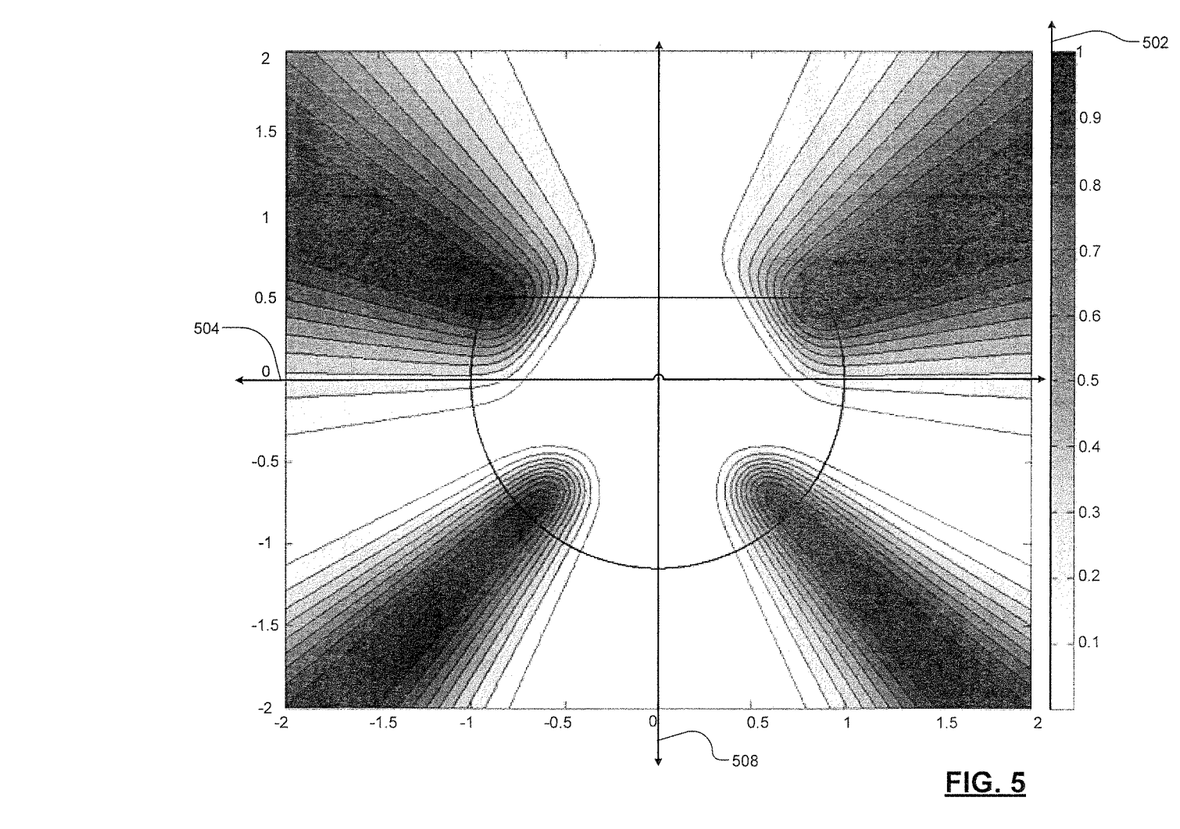
FIG. 5 is an example graph of driver skill values as a function of both lateral and longitudinal acceleration.

FIG. 5 includes an example of graph of skill values 502 as a function of both lateral acceleration 504 and longitudinal acceleration 508. Generally speaking, the skill values increase as the lateral acceleration increases or decreases away from 0 lateral acceleration and decrease as the lateral acceleration approaches 0 lateral acceleration. The skill values also and independently increase as the longitudinal acceleration increases or decreases away from 0 longitudinal acceleration and decrease as the longitudinal acceleration approaches 0 longitudinal acceleration. In other words, the skill values increase as at least one of: (i) a magnitude of lateral acceleration increases and (ii) a magnitude of longitudinal acceleration increases.

The skill values increase more rapidly as both lateral and longitudinal acceleration move away from 0. This may occur as longitudinal acceleration becomes positive and lateral acceleration becomes positive, as longitudinal acceleration becomes positive and lateral acceleration becomes negative, as longitudinal acceleration becomes negative and lateral acceleration becomes positive, and as longitudinal acceleration becomes negative and lateral acceleration becomes negative.

In other words, the skill values increase at a first rate as lateral acceleration becomes more positive given a constant longitudinal acceleration, and the skill values increase at a second rate as lateral acceleration becomes more positive and longitudinal acceleration becomes one of (i) more positive and (ii) more negative, the second rate being greater than the first rate. Additionally, the skill values increase at a first rate as lateral acceleration becomes more negative given a constant longitudinal acceleration, and the skill values increase at a second rate as lateral acceleration becomes more negative and longitudinal acceleration becomes one of (i) more positive and (ii) more negative, the second rate being greater than the first rate. Additionally, the skill values increase at a first rate as longitudinal acceleration becomes more positive given a constant lateral acceleration, and skill values increase at a second rate as longitudinal acceleration becomes more positive and lateral acceleration becomes one of (i) more positive and (ii) more negative, the second rate being greater than the first rate. Additionally, the skill values increase at a first rate as longitudinal acceleration becomes more negative given a constant lateral acceleration, and the skill values increase at a second rate as longitudinal acceleration becomes more negative and lateral acceleration becomes one of (i) more positive and (ii) more negative, the second rate being greater than the first rate. The skill values may increase and decease at linear or non-linear rates. In the example of the further inclusion of vehicle speed, the skill module increases the skill value as at least one of (i) a magnitude of the lateral acceleration increases and (ii) a magnitude of the longitudinal acceleration increases and (iii) as vehicle speed increases. For values of a set of the lateral acceleration 316 and the longitudinal acceleration 332 that fall between entries of skill value lookup table, the skill module 428 may determine the skill value 432 using interpolation, such as linear interpolation.

Referring back to FIG. 4, a second average module 440 determines an average skill value 444 based on an average of a plurality of the skill values 432. For example, the second average module 440 may set the average skill value 444 based on or equal to an average of the most recent predetermined number of the skill values 432. The second average module 440 may, for example, sum the predetermined number of the most recent skill values 432 and divide the sum by the predetermined number.

A skill level module 448 determines a skill level 452 of the driver of the vehicle based on the average skill value 444. For example, the skill level module 448 may set the skill level 452 to expert when the average skill value 444 is greater than a first predetermined value. The skill level module 448 may set the skill level 452 to novice when the average skill value 444 is less than a second predetermined value that is less than the first predetermined value. The skill level module 448 may set the skill level 452 to skilled when the average skill value 444 is between the first predetermined value and the second predetermined value. For example only, based on the skill value function 436 providing skill values that range from 0.0 to 1.0 and that increase and decrease as described above, the first predetermined value may be approximately 0.7 or another suitable value, and the second predetermined value may be approximately 0.4 or another suitable value. While the example of setting the skill level 452 to novice, skilled, or expert is provided, a fewer (e.g., 2) or greater (more than 3) number of skill levels may be used with a corresponding number of predetermined values.

When the track signal 308 is in the second state, 1 classification generation module 456 may set the classification 324 to indicate no classification. When the track signal 308 is in the first state, the classification generation module 456 generates the classification 324 to include the skill level 452 and the handling type 424. For one or more skill levels, such as novice, the classification generation module 456 may generate the classification 324 to include the skill level 452 and not the handling type 424.

Figure 6:
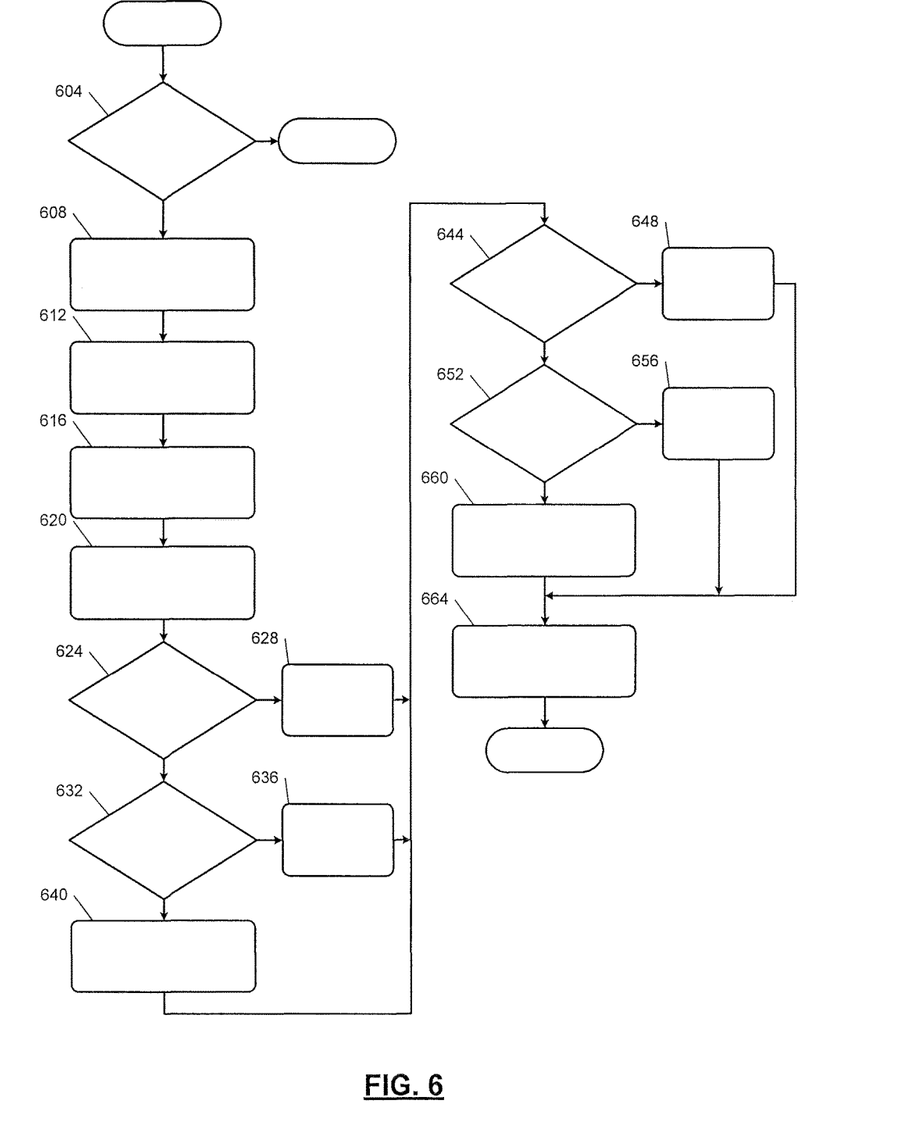
FIG. 6 is a flowchart depicting an example method of determining a skill level of the driver and a handling type.

FIG. 6 is a flowchart depicting an example method of classifying handling type and skill level of the driver. At 604, the classification generation module 456 may determine whether the track signal 308 is in the first state. If 604 is true, control may continue with 608. If 604 is false, the classification generation module 456 may set the classification 324 to indicate no classification, and control may end.

At 608, the rate of change module 404 may determine the SWA ROC 408 based on the SWA 328. The first average module 412 determines the average SWA ROC 416 at 612. The first average module 412 determines the average SWA ROC 416 by averaging the predetermined number of SWA ROCs including the SWA ROC 408 determined at 608 and the predetermined number-1 SWA ROCs 408 from the last predetermined number-1 control loops.

At 616, the skill module 428 may determine the skill value 432 based on both the lateral acceleration 316 and the longitudinal acceleration 332 using the skill value function 436. The skill module 428 may determine the skill value 432 further based on the vehicle speed 312 in various implementations. The second average module 440 may determine the average skill value 444 at 620 by averaging the predetermined number of skill values including the skill value 432 determined at 616 and the predetermined number-1 skill values 432 from the last predetermined number-1 control loops.

The handling module 420 may determine whether the average SWA ROC 416 is less than the second predetermined ROC at 624. If 624 is true, the handling module 420 may set the handling type 424 to understeer at 628, and control transfer to 644, which is discussed further below. If 624 is false, control may continue with 632. The handling module 420 may determine whether the average SWA ROC 416 is greater than the first predetermined ROC at 632. If 632 is true, the handling module 420 may set the handling type 424 to oversteer at 636, and control may transfer to 644. If 632 is false, the handling module 420 may set the handling type 424 to neutral at 640, and control may continue with 644.

At 644, the skill level module 448 may determine whether the average skill value 444 is less than the second predetermined value. If 644 is true, the skill level module 448 may set the skill level 452 to novice at 648, and control may transfer to 664, which is discussed further below. If 644 is false, control may continue with 652.

At 652, the skill level module 448 may determine whether the average skill value 444 is greater than the first predetermined value. If 652 is true, the skill level module 448 may set the skill level 452 to expert at 656, and control transfer to 664. If 652 is false, the skill level module 448 may set the skill level 452 to skilled at 660, and control may continue with 664. At 664, the classification generation module 456 may generate the classification 324 of the driver to include the handling type 424 of the driver and/or the skill level 452. While the example of FIG. 6 is shown as ending, FIG. 6 may be illustrative of one control loop and control may begin a control loop each predetermined period. The classification 324 of the driver is used as discussed further below.

Referring back to FIG. 3, a base module 340 sets base targets (values) 344 for the dynamics actuators 204, respectively, based on the classification 324. For example, the base module 340 may set the base targets 344 to a first predetermined set of the base targets when the classification 324 indicates no classification. The base module 340 may set the base targets 344 to a second predetermined set of the base targets when the classification 324 indicates novice. The base module 340 may set the base targets 344 to a third predetermined set of the base targets when the classification 324 indicates skilled and understeer. The base module 340 may set the base targets 344 to a fourth predetermined set of the base targets when the classification 324 indicates skilled and neutral. The base module 340 may set the base targets 344 to a fifth predetermined set of the base targets when the classification 324 indicates skilled and oversteer. The base module 340 may set the base targets 344 to a sixth predetermined set of the base targets when the classification 324 indicates expert and understeer. The base module 340 may set the base targets 344 to a seventh predetermined set of the base targets when the classification 324 indicates expert and neutral. The base module 340 may set the base targets 344 to an eighth predetermined set of the base targets when the classification 324 indicates expert and oversteer. In general, one predetermined set of base targets may be provided and selected for each possible combination of classification, including skill level and handling type.

An actuator control module 348 adjusts the base targets 344 based on target adjustments 352 to produce final targets, respectively. For example, the actuator control module 348 may sum or multiply the base targets 344 with/by the target adjustments 352, respectively, to produce the final targets. Another suitable form of adjustment may also be used. The actuator control module 348 actuates the dynamics actuators 204 to achieve the final targets, respectively.

A closed loop module 356 sets the target adjustments 352. More specifically, when the track signal 308 is set to the second state, an adjustment module 360 sets the target adjustments 352 to predetermined non-adjusting values. For example, the predetermined non-adjusting values may be zero (in the example of summing the target adjustments 352 with the base targets 344) or one (in the example of multiplying the target adjustments 352 with the base targets 344).

Based on the target adjustments 352 being set to the predetermined non-adjusting values, the actuator control module 348 will set the final targets to the base targets 344, respectively. When the track signal 308 is set to the first state, the adjustment module 360 may set one, more than one, or all of the target adjustments 352 to values other than the predetermined non-adjusting value(s) as discussed further below. In this way, control of the dynamics actuators 204 is tailored to the driver as opposed the base targets 344 which may be calibrated to accommodate drivers of different skill levels and different handling types.

A target yaw module 362 determines a target yaw rate 364 for the vehicle. The target yaw module 362 may determine the target yaw rate 364, for example, based on at least one of the lateral acceleration 316, the longitudinal acceleration 332, the SWA 328, the vehicle speed 312, and an accelerator pedal position (APP) 366. The target yaw module 362 may determine the target yaw rate 364 as a function of the lateral acceleration, longitudinal acceleration, SWA, vehicle speed, and/or APP using one or more equations or lookup tables that relate lateral acceleration, longitudinal acceleration, SWA, vehicle speed, and/or APP to target yaw rate. The APP 366 may be measured using one or more APP sensors or determined based on one or more other parameters. An autonomous driver input may be used in place of APP.

A first error module 368 determines a yaw rate error 370 based on a difference between the target yaw rate 364 and a present yaw rate 372 of the vehicle. For example, the first error module 368 may set the yaw rate error 370 based on or equal to the target yaw rate 364 minus the present yaw rate 372 or the present yaw rate 372 minus the target yaw rate 364. The present yaw rate 372 may be measured using one or more sensors or determined based on one or more other parameters.

An averaging module 374 determines an average yaw rate error 376 based on an average of a plurality of the values of the yaw rate error 370. For example, the averaging module 374 may set the average yaw rate error 376 based on or equal to an average of a most recent predetermined number of values of the yaw rate error 370. The averaging module 374 may, for example, sum the predetermined number of the most recent values of average yaw rate error 376 and divide the sum by the predetermined number.

A second error module 378 determines a yaw error error (YEE) 380 based on a difference between the average yaw rate error 376 and a target yaw error 382. For example, the second error module 378 may set the YEE 380 based on or equal to the target yaw error 382 minus the average yaw rate error 376 or the average yaw rate error 376 minus the target yaw error 382.

A target yaw error module 384 sets the target yaw error 382 based on the classification 324 of the driver. For example only, the target yaw error module 384 may set the target yaw error 382 to a first predetermined yaw error when the classification 324 indicates that the skill level of the driver is novice. The target yaw error module 384 may set the target yaw error 382 to a second predetermined yaw error when the classification 324 indicates that the skill level of the driver is skilled. The target yaw error module 384 may set the target yaw error 382 to a third predetermined yaw error when the classification 324 indicates that the skill level of the driver is expert. The first predetermined yaw error may be less than the second predetermined yaw error, and the second predetermined yaw error may be less than the third predetermined yaw error. This may allow for a greater range of control of one or more of the dynamics actuators 204 as the skill level of the driver becomes more skilled. The target yaw error 382 is a target value for the average yaw rate error 376 given the skill level of the driver.

The target yaw error module 384 may also determine the predetermined yaw error based on the handling type. For example, one set predetermined yaw error may be provided for each different possible skill level and handling type, and the target yaw error module 384 may select one of the predetermined yaw errors based on the skill level and handling type.

An integrator module 386 determines an accumulated error 388 by integrating consecutive and/or non-consecutive values of the YEE 380. For example, when a new value of the YEE 380 is determined, the integrator module 386 may determine a mathematical integral of or based on a difference between the YEE 380 and the last value of the YEE 380. The integrator module 386 may then add the result of the integration to the accumulated error 388 to update the accumulated error 388 based on the new value of the YEE 380. In the example of consecutive values, the last value of the YEE 380 may be the last determined value of the YEE 380. In the example of non-consecutive values, the last value of the YEE 380 may be the last used value of the YEE 380. Use of YEE values may be stopped or paused, for example, during approximately straight line driving and/or low vehicle dynamics situations (e.g., when the track signal 308 is in the second state).

A scaling module 390 may determine a scaled error 392 based on the accumulated error 388 and a scalar value 394. For example, the scaling module 390 may set the scaled error 392 based on or equal to the accumulated error 388 multiplied by the scalar value 394. A scalar module 396 may determine the scalar value 394, for example, based on the vehicle speed 312. The scalar module 396 may determine the scalar value 394, for example, as a function of the vehicle speed 312 using one of an equation and a lookup table that relates vehicle speeds to scalar values. In general, the scalar module 396 may increase the scalar value 394 as the vehicle speed 312 increases and vice versa.

The adjustment module 360 increases one or more of the target adjustments 352 to greater than the predetermined non-adjusting values when both the YEE 380 is greater than a predetermined YEE threshold and the scaled error 392 is greater than a predetermined error threshold. The predetermined YEE threshold and the predetermined error threshold are collectively illustrated in FIG. 3 by 398. While the example of increasing one or more of the target adjustments 352 is discussed, the present application is also applicable to decreasing one or more of the target adjustments and, more generally, adjusting one or more of the target adjustments 352 away from the predetermined non-adjusting values.

The adjustment module 360 may set the target adjustments 352 based on a predetermined priority of use of the dynamics actuators 204. The predetermined priority may indicate to first actuate a first one of the dynamics actuators 204, to second actuate a second one of the dynamics actuators 204, to third actuate a third one of the dynamics actuators 204, etc. Based on the predetermined priority, when both the YEE 380 is greater than the predetermined YEE threshold and the scaled error 392 is greater than the predetermined error threshold, the adjustment module 360 may first increase a first one of the target adjustments 352 associated with the first one of the dynamics actuators 204. The adjustment module 360 may increase the first one of the target adjustments 352, for example, by a predetermined increment amount per control loop until an actuation capacity of the first one of the dynamics actuators 204 is reached. The adjustment module 360 may then increase a second one of the target adjustments 352 associated with the second one of the dynamics actuators 204. The adjustment module 360 may increase the second one of the target adjustments 352, for example, by a predetermined increment amount per control loop until an actuation capacity of the second one of the dynamics actuators 204 is reached. The adjustment module 360 may then increase a third one of the target adjustments 352 associated with the third one of the dynamics actuators 204. The adjustment module 360 may increase the third one of the target adjustments 352, for example, by a predetermined increment amount per control loop until an actuation capacity of the third one of the dynamics actuators 204 is reached, and so on. The actuation capacities of the dynamics actuators 204 are collectively illustrated by 399.

When the YEE 380 is less than the predetermined YEE threshold and/or the scaled error 392 is less than the predetermined error threshold, the adjustment module 360 may decrease the target adjustments 352 toward the predetermined non-adjusting values in the opposite order as the predetermined priority. For example, the adjustment module 360 may first decrease a last one of the target adjustments 352 associated with the last one of the dynamics actuators 204 in the predetermined priority. The adjustment module 360 may decrease the last one of the target adjustments 352, for example, by a predetermined decrement amount per control loop until the last one of the target adjustments 352 reaches the predetermined non-adjusting value. The adjustment module 360 may then decrease a second to last one of the target adjustments 352 associated with the second to last one of the dynamics actuators 204. The adjustment module 360 may decrease the second to last one of the target adjustments 352, for example, by a predetermined decrement amount per control loop until the second to last one of the target adjustments 352 reaches the predetermined non-adjusting value, and so on. While the example of decreasing one or more of the target adjustments 352 is discussed, the present application is also applicable to increasing one or more of the target adjustments and, more generally, adjusting one or more of the target adjustments 352 toward the predetermined non-adjusting values.

A thresholds module 400 determines the predetermined YEE threshold and the predetermined error threshold based on the classification 324 of the driver. For example only, the thresholds module 400 may set the predetermined YEE threshold and the predetermined error threshold to a first predetermined YEE threshold and a first predetermined error threshold, respectively, when the classification 324 indicates that the skill level of the driver is novice. The thresholds module 400 may set the predetermined YEE threshold and the predetermined error threshold to a second predetermined YEE threshold and a second predetermined error threshold, respectively, when the classification 324 indicates that the skill level of the driver is skilled. The thresholds module 400 may set the predetermined YEE threshold and the predetermined error threshold to a third predetermined YEE threshold and a third predetermined error threshold, respectively, when the classification 324 indicates that the skill level of the driver is expert.

The third predetermined YEE threshold and the third predetermined error threshold may be less than the second predetermined YEE threshold and the second predetermined error threshold, respectively. The second predetermined YEE threshold and the second predetermined error threshold may be less than the first predetermined YEE threshold and the first predetermined error threshold, respectively. This may allow adjustment of the dynamics actuators 204, based on the target adjustments 352, sooner as the skill level of the driver becomes more skilled. While the order of priority based example is provided, multiple of the dynamics actuators 204 may be adjusted per control loop and the adjustment module 360 may command adjustment of the dynamics actuators 204 in other ways.

The thresholds module 400 may determine the predetermined YEE threshold and the predetermined error threshold additionally or alternatively based on the handling type. For example, one set of predetermined YEE threshold and predetermined error threshold may be provided for each different possible skill level and handling type, and the thresholds module 400 may select one of the sets based on the skill level and handling type. While the example of use of yaw rate is described herein, yaw angle may be used in place of yaw rate.

Figure 7:
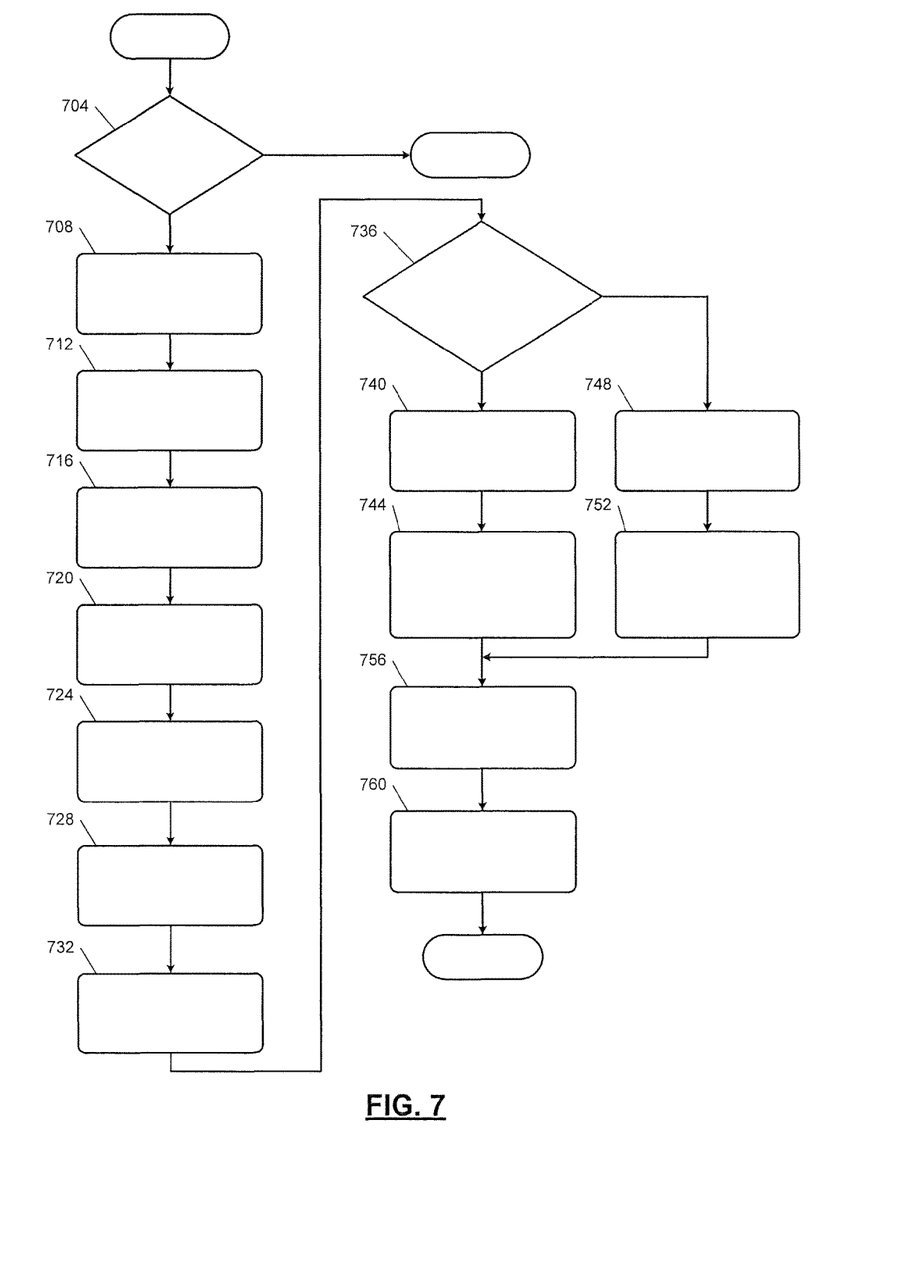
FIG. 7 is a flowchart depicting an example method of controlling dynamics actuators of a vehicle based on a skill level of a driver and/or a handling type.

FIG. 7 is a flowchart depicting an example method of selectively adjusting and controlling the dynamics actuators 204 of the vehicle. Control may begin with 704 where the closed loop module 356 determines whether the track signal 308 is in the first state. If 704 is true, control may continue with 708. If 704 is false, actuator control module 348 may control actuation of the dynamics actuators 204 based on the base targets 344 and control may end. The adjustment module 360 may set the target adjustments 352 to the predetermined non-adjusting values to accomplish this.

At 708, based on the classification 324 of the driver, the target yaw error module 384 may determine the target yaw error 382 and the thresholds module 400 may determine the predetermined YEE threshold and the predetermined error threshold. The scalar module 396 may also determine the scalar value 394 based on the vehicle speed 312 at 708.

The target yaw module 362 determines the target yaw rate 364 at 712. The target yaw module 362 determines the target yaw rate 364 based on the lateral acceleration 316, the longitudinal acceleration 332, the SWA 328, the APP 366, and/or the vehicle speed 312. The first error module 368 determines the yaw rate error 370 at 716 based on a difference between the target yaw rate 364 and the present yaw rate 372.

At 720, the averaging module 374 determines the average yaw rate error 376 by averaging the predetermined number of yaw rate errors including the yaw rate error 370 determined at 716 and the predetermined number-1 yaw rate errors 370 from the last predetermined number-1 control loops. The second error module 378 determines the YEE 380 at 724 based on a difference between the target yaw error 382 and the average yaw rate error 376.

The integrator module 386 may determine a mathematical integral of a difference between the YEE 380 determined at 728 and a last value of the YEE 380 from a last control loop. The integrator module 386 may sum the result with a last value of the accumulated error 388 from a last control loop to determine/update the accumulated error 388 for the present control loop.

At 732, the scaling module 390 determines the scaled error 392 based on the accumulated error 388 and the scalar value 394. For example, the scaling module 390 may set the scaled error 392 based on or equal to the accumulated error 388 multiplied by the scalar value 394.

The adjustment module 360 may determine whether the YEE 380 and the scaled error 392 are greater than the predetermined YEE threshold and the predetermined error threshold, respectively, at 736. If both are true at 736, control may continue with 740. If one or more of the conditions are false at 736, control may transfer to 748, which is discussed further below.

At 740, the adjustment module 360 may determine which one or more of the dynamics actuators 204 to adjust. For example, the adjustment module 360 may select one of the dynamics actuators 204 having a highest priority in the predetermined priority that is not presently at its actuation capacity. The adjustment module 360 may adjust the target adjustments 352 of the selected ones of the dynamics actuators 204 (e.g., increment) away from the predetermined non-adjusting values at 744, and control continues with 756, which is discussed further below. At 748, the adjustment module 360 may determine which one or more of the dynamics actuators 204 to adjust. For example, the adjustment module 360 may select one of the dynamics actuators 204 having a lowest priority in the predetermined priority having an associated one of the target adjustments 352 that is not presently at the predetermined non-adjusting value. The adjustment module 360 may adjust the target adjustments 352 of the selected ones of the dynamics actuators 204 (e.g., decrement) toward the predetermined non-adjusting values at 752, and control continues with 756.

At 756, the actuator control module determines the final targets for the dynamics actuators 204 based on the base targets 344 and the target adjustments 352, respectively. For example, the actuator control module 348 may sum or multiply the base targets 344 with the respective target adjustments 352. The actuator control module 348 controls actuation of the dynamics actuators 204 based on the respective final targets at 760, and control may end. While the example of FIG. 7 is shown as ending, FIG. 7 may be illustrative of one control loop and control may begin a control loop each predetermined period. FIG. 7 be executed in parallel with FIG. 6.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A vehicle control system comprising:
   a function that relates (i) pairs to (ii) skill values, wherein each of the pairs includes one lateral acceleration value and one longitudinal acceleration value,
   wherein at least one of (a), (b), (c), and (d):
   (a) the skill values increase at a first rate as lateral acceleration becomes more positive given a constant longitudinal acceleration, the skill values increase at a second rate as lateral acceleration becomes more positive and longitudinal acceleration becomes one of (i) more positive and (ii) more negative, and the second rate is greater than the first rate;
   (b) the skill values increase at a first rate as lateral acceleration becomes more negative given a constant longitudinal acceleration, the skill values increase at a second rate as lateral acceleration becomes more negative and longitudinal acceleration becomes one of (i) more positive and (ii) more negative, and the second rate is greater than the first rate;
   (c) the skill values increase at a first rate as longitudinal acceleration becomes more positive given a constant lateral acceleration, the skill values increase at a second rate as longitudinal acceleration becomes more positive and lateral acceleration becomes one of (i) more positive and (ii) more negative, and the second rate is greater than the first rate; and
   (d) the skill values increase at a first rate as longitudinal acceleration becomes more negative given a constant lateral acceleration, the skill values increase at a second rate as longitudinal acceleration becomes more negative and lateral acceleration becomes one of (i) more positive and (ii) more negative, and the second rate is greater than the first rate;
   a skill circuit that:
   receives both (i) a lateral acceleration of and (ii) a longitudinal acceleration of the vehicle; and using the function, determines a skill value of a driver of the vehicle based on both (i) the lateral acceleration of the vehicle and (ii) the longitudinal acceleration of the vehicle;

a skill level circuit that determines a skill level of the driver of the vehicle based on the skill value; and an actuator control circuit that, based on the skill level of the driver, selectively actuates one of:
  an electronic limited slip differential;
  an electronic power steering motor;
  an automatic braking system (ABS) actuator;
  a ride control actuator; and
  an aerodynamic actuator.

2. The vehicle control system of claim 1 wherein the skill level circuit selects the skill level of the driver from a group comprising a first skill level, a second skill level indicative of a greater level of skill than the first skill level, and a third skill level indicative of a greater level of skill than the second skill level.

3. The vehicle control system of claim 1 wherein the skill values of the function increase as at least one of: (i) a magnitude of lateral acceleration increases and (ii) a magnitude of longitudinal acceleration increases.

4. The vehicle control system of claim 1 wherein the lateral acceleration of the vehicle is measured using a lateral acceleration sensor.

5. The vehicle control system of claim 1 wherein the longitudinal acceleration of the vehicle is measured using a longitudinal acceleration sensor.

6. A vehicle control method comprising:
  receiving both (i) a lateral acceleration of the vehicle and (ii) a longitudinal acceleration of the vehicle;
  using a function that relates (i) pairs to (ii) skill values, wherein each of the pairs include one lateral acceleration value and one longitudinal acceleration value, determining a skill value of a driver of the vehicle based on both (i) the lateral acceleration of the vehicle and (ii) the longitudinal acceleration of the vehicle;
  wherein at least one of (a), (b), (c), and (d):
    (a) the skill values of the function increase at a first rate as lateral acceleration becomes more positive given a constant longitudinal acceleration, the skill values of the function increase at a second rate as lateral acceleration becomes more positive and longitudinal acceleration becomes one of (i) more positive and (ii) more negative, and the second rate is greater than the first rate;
    (b) the skill values of the function increase at a first rate as lateral acceleration becomes more negative given a constant longitudinal acceleration, the skill values of the function increase at a second rate as lateral acceleration becomes more negative and longitudinal acceleration becomes one of (i) more positive and (ii) more negative, and the second rate is greater than the first rate;
    (c) the skill values of the function increase at a first rate as longitudinal acceleration becomes more positive given a constant lateral acceleration, the skill values of the function increase at a second rate as longitudinal acceleration becomes more positive and lateral acceleration becomes one of (i) more positive and (ii) more negative, and the second rate is greater than the first rate; and
    (d) the skill values of the function increase at a first rate as longitudinal acceleration becomes more negative given a constant lateral acceleration, the skill values of the function increase at a second rate as longitudinal acceleration becomes more negative and lateral acceleration becomes one of (i) more positive and (ii) more negative, and the second rate is greater than the first rate;
  determining a skill level of the driver of the vehicle based on the skill value; and,
  based on the skill level of the driver, selectively actuating one of:
    an electronic limited slip differential;
    an electronic power steering motor;
    an automatic braking system (ABS) actuator;
    a ride control actuator; and
    an aerodynamic actuator.

7. The vehicle control method of claim 6 wherein determining the skill level includes selecting the skill level of the driver from a group comprising a first skill level, a second skill level indicative of a greater level of skill than the first skill level, and a third skill level indicative of a greater level of skill than the second skill level.

8. The vehicle control method of claim 6 wherein the skill values of the function increase as at least one of: (i) a magnitude of lateral acceleration increases and (ii) a magnitude of longitudinal acceleration increases.

9. The vehicle control method of claim 6 further comprising measuring the lateral acceleration of the vehicle using a lateral acceleration sensor.

10. The vehicle control method of claim 6 further comprising measuring the longitudinal acceleration of the vehicle using a longitudinal acceleration sensor.

* * * * *